Feb. 3, 1970 D. ZEHEB 3,493,732

DIGITAL POSITIONER

Filed Nov. 9, 1965 2 Sheets-Sheet 1

INVENTOR
DAVID ZEHEB

BY Edward G. Fiorito

ATTORNEY

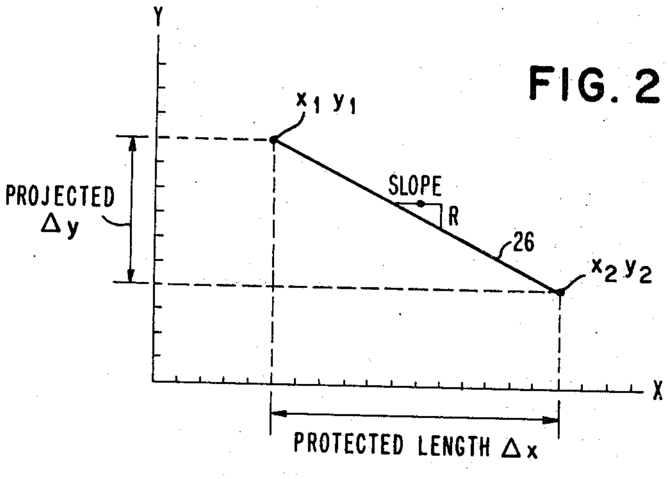
FIG. 2
| CLOCK | COUNTER 22 | COUNTER 24 | CONTENTS OF ADDER 56 |
|---|---|---|---|
| | | | INITIAL .7 |
| 1 | Y | | CARRY ← .4 |
| 2 | | X | |
| 3 | Y | | CARRY ← .1 |
| 4 | | X | |
| 5 | Y | | .8 |
| 6 | Y | | CARRY ← .5 |
| 7 | | X | |
| 8 | Y | | CARRY ← .2 |
| 9 | | X | |
| 10 | Y | | .9 |
| 11 | Y | | CARRY ← .6 |
| 12 | | X | |
| 13 | Y | | CARRY ← .3 |
| 14 | | X | |
| 15 | Y | | CARRY ← .0 |
| 16 | | X | |
| 17 | Y | | .7 |
FIG. 3
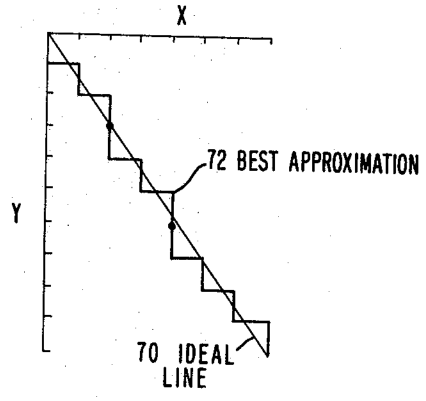
FIG. 4

United States Patent Office 3,493,732

Patented Feb. 3, 1970

3,493,732
DIGITAL POSITIONER

David Zeheb, Hillsdale, N.J., assignor to International Business Machines Corporation, Armonk, N.Y., a corporation of New York Filed Nov. 9, 1965, Ser. No. 506,943
Int. Cl. G06f *15/20;* G06g *7/48*
U.S. Cl. 235—151 5 Claims

ABSTRACT OF THE DISCLOSURE

A system and method is described for controlling the motion of an electron beam on a surface so that the best possible approximation to straight line motion is achieved. The slope R of the line to be drawn is placed in a storage register and applied initially to an adder. By means of a gate, the slope R is added to itself a successive number of times. For each addition, a Y deflection coil increments the electron beam in the vertical direction. Each time a carry is sensed in the last position of the adder, an X deflection coil increments the electron beam in the horizontal direction. By following this procedure, the electron beam moves no further from the ideal straight line than one incremental distance.

Many systems for positioning objects employ two motivating devices located at right angles, or orthogonal to one another. For example, there are cathode ray tubes which employ two deflection coils, one to position the beam along the horizontal direction and the other to position the beam along the vertical direction. If it becomes necessary to draw a diagonal line across the face of the cathode ray tube the vertical and horizontal deflection coils must be simultaneously energized in some proportion related to the slope of the diagonal line. This is frequently accomplished by analog techniques which continuously vary the voltage on the deflection coils.

These analog techniques are subject to the problems of temperature sensitivity and degeneration of component tolerances with age causing an inherent instability. Digital techniques can be employed to step the horizontal and vertical deflection coils with greater precision and repeatable performance. However, when diagonal lines are drawn the horizontal and vertical deflection coils must be incremented in a precise sequence to obtain the best possible approximation of the straight line.

It is an object of the present invention to provide improved methods and apparatus for digital positioning.

Another object of the present invention is to provide improved methods and apparatus for moving an object in orthogonal increments approximating a straight line.

Still another object of the present invention is to provide methods and apparatus for selecting the sequence of orthogonal increments which best approximates straight line motion.

It is a further object of the present invention to provide apparatus which selects the optimum sequence of orthogonal increments to approximate straight line motion, using a minimum of hardware.

These and other objects of the present invention are accomplished by observing the slope of the straight line motion to be followed with respect to a pair of orthogonal axes. The slope is added to itself a successive number of times, and a carry from the most significant digit is sensed.

Each time the slope is added to itself the object is moved an incremental distance parallel to one of the axes. Each time a carry is sensed, the object is incremented an equal amount parallel to the other axis. In this manner, motion along a substantially straight line is achieved with variations therefrom limited to less than one increment.

The foregoing and other objects, features, and advantages of the invention will be apparent from following more pariticular description of a preferred embodiment of the invention, as illustrated in the accompanying drawings:

In the drawings:

FIG. 2 is a graph illustrating those parameters of a straight line which are applied to the system of FIG. 1;

FIG. 3 is a table listing the sequence of operations performed by the system of FIG. 1 in response to a specific set of inputs; and FIG. 4 is a graph showing the manner in which the system of FIG. 1 approximates straight line motion.

Figure 1:
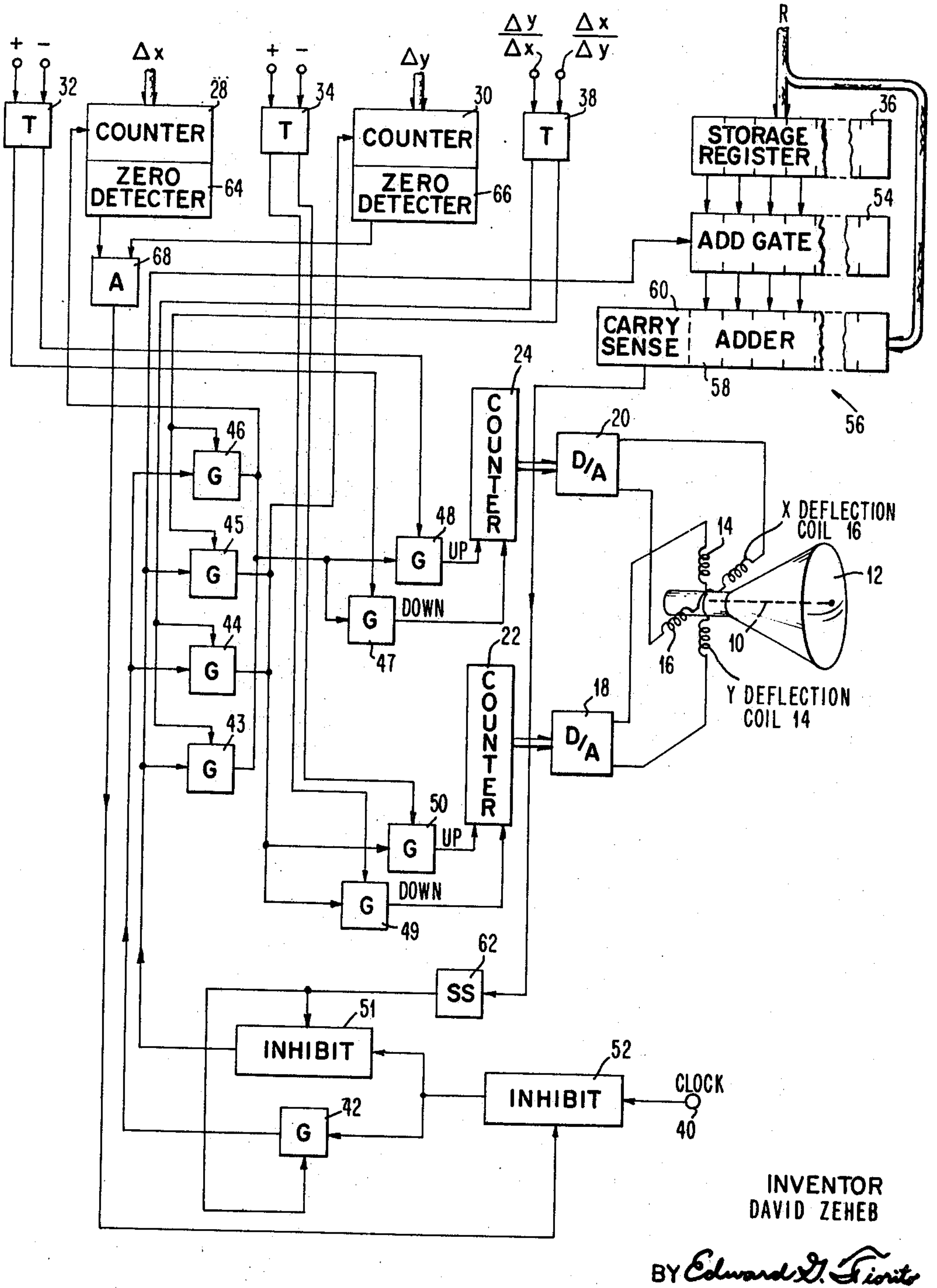
FIG. 1 is a block diagram illustrating a cathode ray tube control system embodying the present invention.

The present invention may be employed in positioning an electron beam 10, FIG. 1 of a cathode ray tube 12. In accordance with the usual construction of a cathode ray tube, a *y* deflection coil 14 is set at right angles, or orthogonal to an *x* deflection coil 16. Variations in the voltage applied to the *y* deflection coil 14 cause motion of the electron beam in a vertical direction, while variations in the voltage applied to the *x* deflection coil 16 cause horizontal motion of the electron beam 10.

The control voltages applied to the coils 14 and 16 are developed by a pair of digital to analog converters 18 and 20 respectively. The converters 18 and 20 convert digital numbers stored in a pair of counters 22 and 24 into an analog voltage on coils 14 and 16 having magnitudes corresponding to the digital numbers stored in counters 22 and 24 respectively.

In accordance with the present invention, the counters 22 and 24 are stepped up or down in a certain sequence so that the electron beam is moved in small increments diagonally across the CRT 12 approximating straight line motion. Certain parameters of the line to be drawn are fed to the inputs at the top of the system of FIG. 1. These parameters are represented graphically in FIG. 2.

A straight ilne 26 is shown in FIG. 2 having a slope R with respect to a pair of orthogonal axes Y and X. The straight line 26 is drawn between two points having the co-ordinates $x_1y_1$ and $x_2y_2$. The slope R is given by $(y_2-y_1)/(x_2-x_1)$ or $\Delta y/\Delta x$, where $\Delta y$ is the projected length of line 26 on the Y axis, and $\Delta x$ is the projected length of line 26 on the X axis.

The units marked off along the X and Y axes of FIG. 2 correspond to the incremental distances the deflection coils 14 and 16 move the electron beam 10 in response to the steps taken by counters 22 and 24. The value of $\Delta x$ and $\Delta y$ in such units are set into a pair of counters 28 and 30 respectively. Also, a pair of triggers 32 and 34 are provided for receiving the sign of the $\Delta x$ and $\Delta y$ given by expressions $(x_2-x_1)$, and $(y_2-y_1)$ respectively.

The slope R is set into a storage register 36. The slope R is always selected to be less than 1 so that in the example shown in FIG. 2, $\Delta y$ is divided by $\Delta x$ since the projected length on the X axis is larger on the projected length on the Y axis. If the projected length on the Y axis were larger than the projected length on the X axis, then the slope would be given by $\Delta x/\Delta y$ to maintain the slope R less than 1. A trigger 38 is provided for storing an indication of which form of the slope R is employed.

The operation of the system in FIG. 1 is synchronized by a train of clock pulses applied to a terminal 40. Each time a clock pulse is applied to terminal 40, either counter 22 or counter 24 is stepped under control of a group of gates 42 through 52. Gates 42 through 50 operate in a conventional manner passing the clock pulse applied to the input thereof only when an enabling signal is applied to a second input thereof. Inhibit gates 51 and 52 block the clock pulses applied thereto whenever a signal is applied to the second input thereof.

After the inputs have been applied to the top of the system of FIG. 1, the first clock pulse passes through inhibit gates 51 and 52 and arrives at gates 43 and 45. The setting of trigger 38 determines whether gate 43 or 45 passes this clock pulse. For the line 26 in FIG. 2 where $\Delta y$ is shorter than $\Delta x$, gate 43 is enabled passing the first clock pulse by gates 47 and 48. The setting of trigger 32 determines whether gate 47 or gate 48 is enabled. In the example of FIG. 2, $x_2$ is greater than $x_1$ so $\Delta x$ which is equal to $x_2-x_1$ is positive. Accordingly, trigger 32 enables gate 48. The clock pulse passing through gate 48 steps counter 24 up one position. Digital analog converter 20 increases the voltage on $x$ deflection coil 16 a corresponding amount causing the electron beam 10 to move to the right a certain incremental distance.

The first clock pulse passing through inhibit 51 is also applied to an add gate 54 which enables the slope R stored in register 36 to be applied to the input of an adder 56. During the initial loading of register 36, the slope R is placed in adder 56, so that the first clock pulse causes the slope R to be added to itself. If a carry is produced from a position 58 of adder 56 corresponding to the most significant digit of the slope R, a carry sense circuit 60 produces a pulse. The carry digit is not saved by the added 56 for subsequent additions.

The pulse from carry sense circuit 60 starts a single shot multivibrator 62 which produces a signal lasting for one clock cycle, or long enough to enable the second clock pulse to pass through gate 42 and to be blocked by inhibit 51. This second clock pulse arrives at gates 44 and 46. Since trigger 38 is set to enable gate 44, the clock pulse passes to gates 49 and 50. The setting of trigger 34 determines which of the gates 49 and 50 are enabled. For the example shown in FIG. 2, $\Delta y$ has a negative sign since $y_1$ is larger than $y'_2$. Therefore, gate 49 is enabled causing counter 22 to be stepped down one position. Digital to analog converter 18 produces a voltage change on $y$ deflection coil 14 causing electron beam 10 to be moved an incremental distance down.

Since the second clock pulse passes through gate 42 instead of inhibit 51, no clock pulse arrives at add gate 54, and no further addition takes place in adder 56 during this clock cycle.

By the time the third clock pulse arrives, single shot 62 is returned to its quiescent state and inhibit 51 is free to pass the third clock pulse to operate counter 24 in the same manner as the first clock pulse. The operation continues as outlined above until the end of the straight line 26 is reached. The end is detected by a pair of zero detectors 64 and 66 responsive to counters 28 and 30 respectively. Counters 28 and 30 are stepped down each time a clock pulse is applied to counters 24 and 22 respectively, through connections with gates 43–46. When both counters 28 and 30 have reached zero, zero detectors 64 and 66 provide signals to an and gate 68 which applies a singal to inhibit gate 52 blocking further clock pulses until new inputs are applied to the system of FIG. 1.

FIG. 3 is a chart summarizing the operation of the system of FIG. 1 in response to a particular set of input parameters. A slope R of .7 is initially set into storage register 36 and adder 56. Normally, the decimal number .7 is coded in binary form resulting in more than one digit. However to present the invention in the simplest fashion, a slope R of just one decimal digit is used herein. When the first clock pulse arrives, counter 22 is stepped down and the slope .7 is added to itself in adder 56 yielding a carry and a result of .4. Since a carry is sensed during the first clock pulse, the second clock pulse steps counter 24 up. During the third clock cycle, the slope .7 is added to the contents (.4) of adder 56 once again producing a carry and a result of .1. Therefore, the fourth clock pulse steps counter 24. The fifth clock pulse steps counter 22 and causes the slope .7 to be added to the contents (.1) of the adder 56. This time, however, no carry is produced. Therefore, the sixth clock pulse steps counter 22. The operation continues as shown in the table of FIG. 3.

The graph in FIG. 4 (a graphic illustration of FIG. 3) shows the results of the operation of the system of FIG. 1 for a slope of .7. An ideal straight line 70 having a slope .7 with respect to the X and Y axes is shown. The best line that can be drawn approximating line 70 when drawn in orthogonal increments is illustrated by a line 72. The line 72 is formed by incremental motion parallel to the X and Y axes in the sequence listed in the X and Y columns of FIG. 3. On two occasions, the line 72 is incremented twice in the Y axis direction. This double increment occurs at times calculated to produce the best possible approximation of the straight line 70 to within one incremental distance. The increments in the example of FIG. 4 are exaggerated for illustrative purposes. In practice, it would be desirable to reduce the increments to an amount in the range of the diameter of the electron beam so that the line 72 would appear smooth to the eye.

While the illustrative embodiment of the invention positions an electron beam 10, the output from digital to analog converters 18 and 20 could be used to operate servomotors to position any object. It will be understood by those skilled in the art that the foregoing and other changes in form in detail may be made therein without departing from the spirit and scope of the invention.

What is claimed is:

1. A method of moving a movable entity in a substantially straight line in a plane, said line having a given slope value with respect to first and second coordinate axes in said plane comprising the steps of:

entering said slope value in an adder means adapted to provide a carry value, adding said slope value to itself a successive number of times in said adder means, moving said movable entity an incremental distance in said plane in a direction parallel to said first coordinate axis each time said slope value is added to itself, and further moving said movable entity said incremental distance in said plane in a direction parallel to said second axis each time a carry value is produced by said addition.

2. Apparatus for moving a movable entity in a substantially straight line in a plane, said line having a given slope value with respect to first and second coordinate axes in said plane comprising:

adder means containing a value equal to said slope value, said adder means adapted to provide a signal when a carry value is produced, means connected to said adder means for entering a value equal to said slope value into said adder a successive number of times, said adder adding said successive values and producing a signal when said addition produces a carry value, means responsive to said adder means for moving said movable entity an incremental distance in said plane in a direction parallel to said first coordinate axis for each addition performed by said adder means, and means responsive to said adder means for moving said movable entity said incremental distance in a direction parallel to said second axis for each occurrence of said signal produced when a carry value is produced.

3. Apparatus as defined in claim 2 wherein said adder means includes a position for each digit in said slope value and said carry signal is generated each time a carry value is produced from the position corresponding to the most significant digit in said slope valve.

4. Apparatus for moving a movable entity along a substantially straight line in a plane, said line having a given slope value with respect to first and second orthogonal coordinate axes, and said line having a first projected length on said first axis which is larger than a second projected length of said line on said second axis, comprising:

storage means for storing a number equal to the ratio of said second projected length to said first projected length;

adder means connected to said storage means and responsive to said ratio number for adding said ratio number to itself a successive number of times, said adder means including a position for each digit in said ratio number;

carry means responsive said adder means for sensing a carry indication from the position in said adder means corresponding to the most significant digit in said ratio;

first means for moving said movable entity an incremental distance in a direction parallel to said first axis;

second means for moving said movable entity an amount equal to said incremental distance in a direction parallel to said second axis; and control means connected to said adder means, said carry means and said first and second means for operating said first means each time said ratio number is added to itself, and for operating said second means each time a carry indication is sensed by said carry means.

5. Apparatus as defined in claim 4 further characterized by:

first and second counter means connected to said control means for storing the number of said incremental distances included in said first and second projected lengths, respectively;

means connected to said first and second counters for stepping down said first and second counters in response to the operation of said first and second means, respectively; and means responsive to the arrival of both said counters at zero for terminating the operation of said control means.

References Cited

UNITED STATES PATENTS

| | | | |
|---|---|---|---|
| 3,128,374 | 4/1964 | Ho et al. | 235—152 XR |
| 3,254,203 | 5/1966 | Kveim | 235—151.11 XR |
| 3,333,147 | 7/1967 | Henderson | 340—324 XR |
| 3,335,315 | 8/1967 | Moore | 315—18 |
| 3,337,860 | 8/1967 | O'Hara | 315—18 XR |
| 3,364,479 | 1/1968 | Henderson et al. | 340—324 |
| 3,372,268 | 3/1968 | Hoernes | 235—151.11 |

EUGENE BOTZ, Primary Examiner

U.S. Cl. X.R.

235—152; 340—324